Feb. 11, 1969 A. W. LOHMANN 3,427,586

FRESNEL CORRELATION TECHNIQUE

Filed April 29, 1965 Sheet 1 of 3

INVENTOR
ADOLF W. LOHMANN

By Elmer Galbraith

ATTORNEY

United States Patent Office 3,427,586

Patented Feb. 11, 1969

3,427,586

FRESNEL CORRELATION TECHNIQUE

Adolf W. Lohmann, San Jose, Calif., assignor to International Business Machines Corporation, Armonk, N.Y., a corporation of New York Filed Apr. 29, 1965, Ser. No. 451,756
U.S. Cl. 340—146.3 14 Claims
Int. Cl. G06k 9/00; G02b 1/00

ABSTRACT OF THE DISCLOSURE

A space invariant character recognition system using Fresnel diffraction and an easily produced detection mask which merely has thereon an image of the actual character which one desires to detect: In this system an input object having characters thereon is placed next to a light diffusing element such as a piece of ground glass. A spatially and spectrally coherent light source is used to generate a Fresnel diffraction pattern of said characters on the light diffusing means. The light which is transmitted through the light diffusing means is used as a light source for a second optical system, which includes a mask which has the desired characters thereon. The second optical system generates a Fresnel diffraction pattern of the characters on the mask. Peak light intensities are created in the output plane at locations which correspond to the locations on said input object where a character corresponding to said desired character is located.

The present invention relates to optical systems. More particularly, the present invention relates to optical correlation systems.

In general, optical correlation systems include a plurality of lenses, an input object which has characters or patterns thereon, and a detection mask which has some particular character or pattern thereon. The purpose of a correlation system is to determine if the character or pattern on the input object correlates with the character or pattern on the detection mask.

In order for a correlation system to be useful in most applications, the correlation must be space invariant. This means that the correlation must not depend on the location of the characters on the input object. The space invariant optical correlation systems shown in the prior art use Fraunhofer diffraction patterns. In these systems one must use detection masks that have characters or patterns thereon that are the Fourier transforms of the desired characters or patterns. For example, an article by L. Horwitz and G. Shelton, published in the proceedings of the IRE, vol. 49, p. 175 (1961) shows a space invariant character recognition system which uses detection masks that are the Fourier transforms of the desired characters. Another space invariant system shown in an article by A. Van der Lugt, published in the IEEE Transactions on Information Theory, 1964, p. 139, uses an optical detection technique called "complex matched filtering." The disadvantage of the systems shown in the above references is that the detection masks required are difficult to produce.

The present invention provides an improved semi-space invariant detection and recognition system which has many of the same advantages as do the space invariant systems shown in the prior art. Furthermore, with the present invention the detection mask required to detect a particular pattern or character merely needs have an image of the particular pattern or character thereon. Thus, the detection mask is very easy to produce.

An object of the present invention is to provide an improved optical correlation system.

Yet another object of the present invention is to provide an optical correlation system which utilizes relatively simple detection masks.

Another object of the present invention is to provide an improved optical correlation system wherein the relative position of the input object and the detection mask is not an important element in the correlation process.

Yet another object of the present invention is to provide an improved optical character recognition system.

Still another object of the present invention is to provide an optical system that can detect the presence of a particular pattern on an object.

Yet another object of the present invention is to provide a system which can detect the presence of a particular word in a block of text recorded on photographic film.

Still another object of the present invention is to provide a system which can both detect the presence of a particular word in a block of text and which can indicate where the desired word is located in the text.

The reason that the present invention requires a relatively simple detection mask, whereas the systems shown in the prior art require relatively complex detection masks is that the present invention utilizes the principle of Fresnel diffraction whereas the space invariant optical detection and recognition schemes shown in the prior art utilize Fraunhofer diffraction. The present invention includes the combination of two groups of components in series. The first group of components generates Fresnel diffraction patterns due to the characters or patterns on the input object. These Fresnel diffraction patterns are generated on a light diffusing element. The second group of components uses the light from the light diffusing element to generate Fresnel diffraction patterns of a desired character, whereby points of peak intensity are generated when a character or pattern on the input object correlates with the desired character.

The foregoing and other objects, features and advantages of the invention will be apparent from the following more particular description of preferred embodiments of the invention, as illustrated in the accompanying drawings.

Figures 1, 1A:
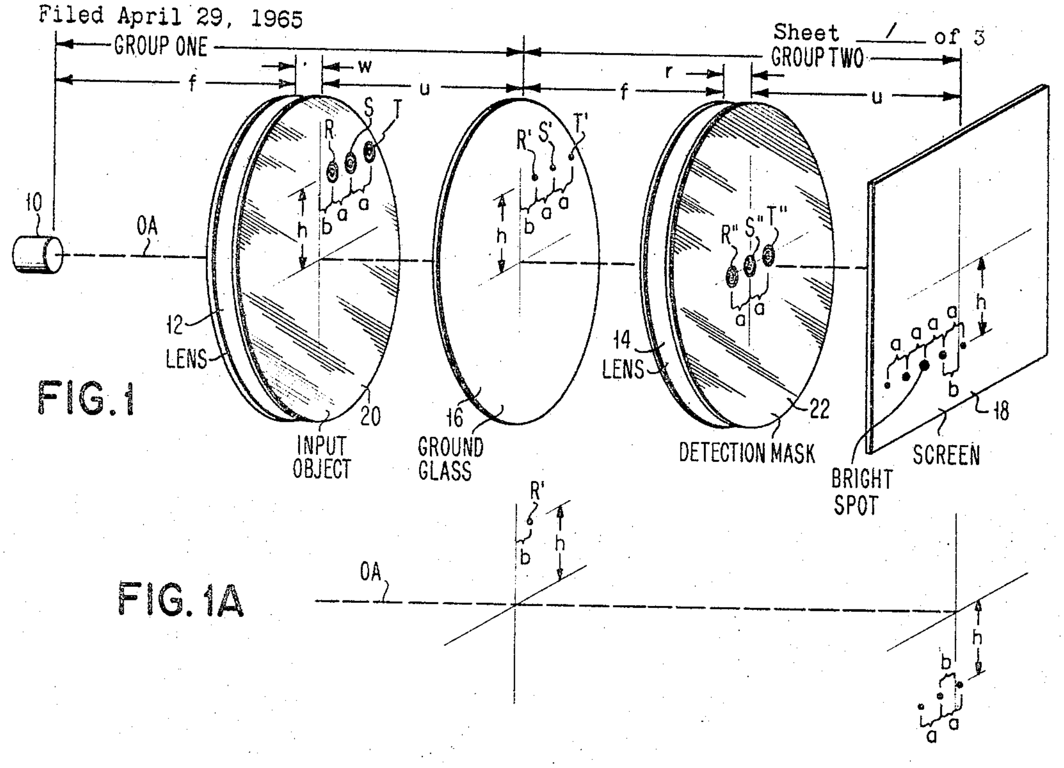
FIGURE 1 is a perspective view of a simplified embodiment of the present invention wherein the input object and the detection mask contain identical patterns.
FIGURES 1A, 1B, 1C and 1D are schematic diagrams which explain the operation of the system shown in FIGURE 1.

The simplified embodiment of the invention shown in FIGURE 1 includes a point source of monochromatic light 10, two lenses 12 and 14, a plane of ground glass 16, a screen 18, an input object 20 and a detection mask 22. The distance between the various components as shown in FIGURE 1 is merely meant to be illustrative and in certain respects the distances have been distorted for ease in illustration. The essential relationships that the distances between the various components must satisfy will be explained in detail later.

The various components are divided into two groups that are designated group ONE and group TWO. Group ONE includes light source 10, lens 12, object 20 and ground glass 16. Group TWO also includes ground glass 16 and in addition it includes lens 14, detection mask 22 and screen 18. The components in group ONE direct light at the characters on object 20 and thereby form Fresnel diffraction patterns on ground glass 16. The elements in group TWO use the light passing through ground glass 16 as a light source. The light passing through ground glass 16 is directed at the detection mask 22 to form Fresnel diffraction patterns on screen 18. If the characters on detection mask 22 are identical to the characters on any portion of input object 20, the diffraction pattern on the screen 18 has an area with a relatively high intensity of light. If, on the other hand, there are no characters on object 20 that correspond to the characters on mask 22, the peak intensity of the illumination on screen 18 is relatively low.

The input object 20 and detection mask 22 can have any type of characters or patterns thereon and the intensity of the light on screen 18 will indicate if the same character or pattern as that located on detection mask 22 is located anywhere on object 20. That is, the light on screen 18 indicates if any character or pattern on object 20 correlates with the character or pattern on mask 22. Furthermore, the locations of peak intensity on screen 18 indicate the location of the correlating character.

Figure 2:
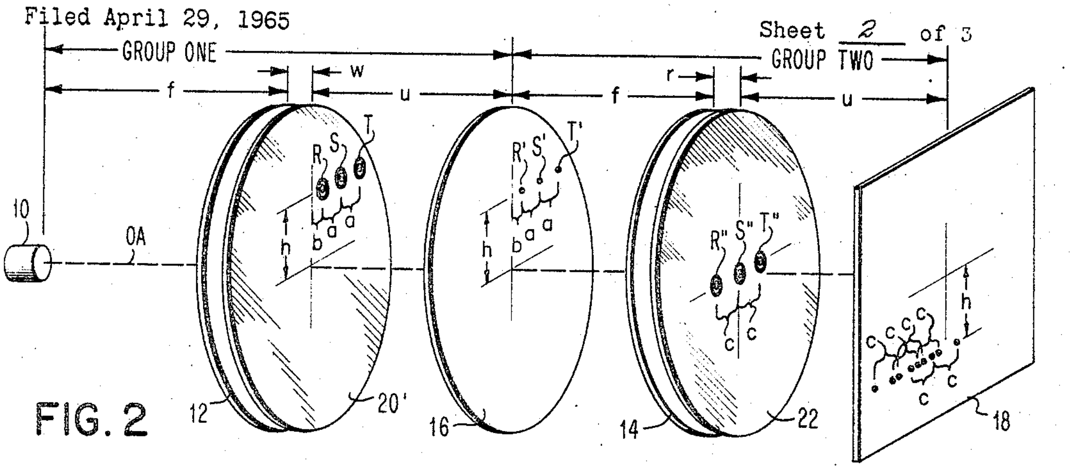
FIGURE 2 is a perspective view of a simplified embodiment of the present invention wherein the input object and the detection mask contain different patterns.
Figure 4:
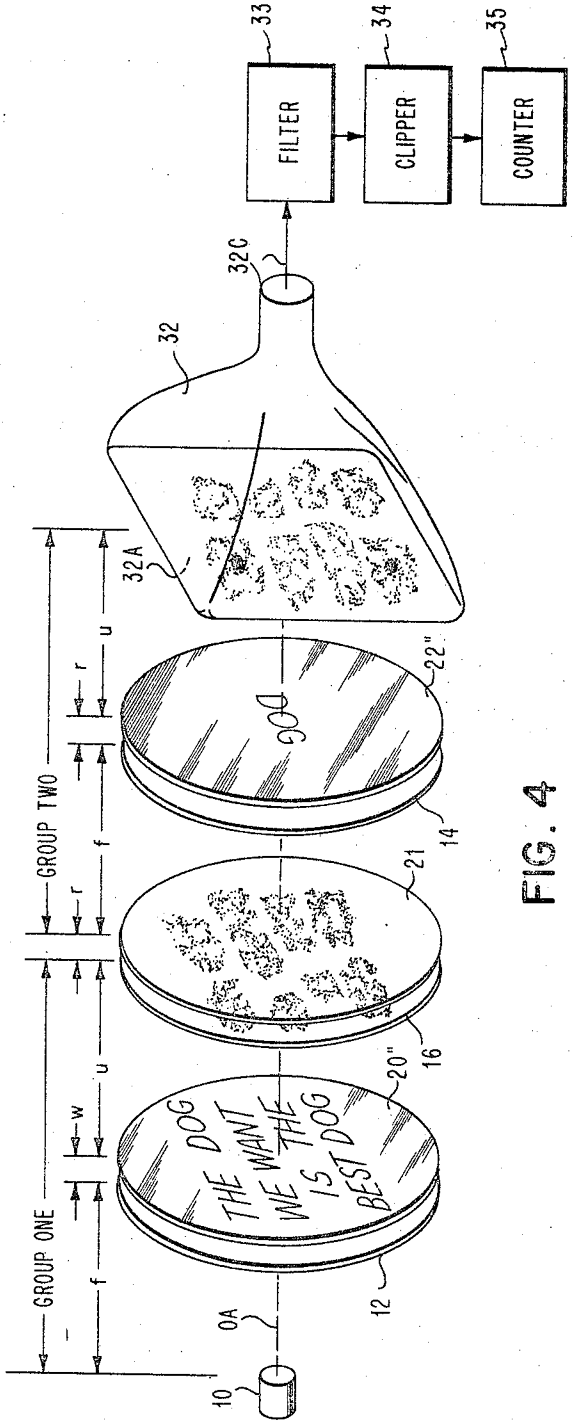
FIGURE 4 is a perspective view of a second preferred embodiment of the present invention.

The characters or patterns on object 20 and detection mask 22 are formed by transparent areas. The remaining portions of the object 20 and the remaining portion of mask 4 are opaque. FIGURE 4 shows an input object 20 and a detection mask 22 that have alphanumeric information thereon. However, in order to facilitate the explanation of the invention, FIGURES 1 and 2 show an input object 20 that has a pattern thereon that consists of circular rings that form three Fresnel zone plates designated R, S and T. Object 20 is opaque except for the transparent circular rings that form the three Fresnel zone plates designated R, S and T. The reason that an input object 20 having circular Fresnel zone plates thereon was chosen is that a circular Fresnel zone plate generates a very simple Fresnel diffraction zone plate. The diffraction zone plate due to a circular Fresnel zone plate is merely a single dot or spot. Hence, the three circular Fresnel zone plates on input object 20 produce three dots on the face of ground glass 16. Clearly, if any other characters or patterns are on object 20, the Fresnel pattern generated on ground glass 16 is much more complicated and difficult to explain. It should, however, be understood that the present invention is applicable with any type of input pattern or character including alphanumeric and aerial photographs as will be explained in detail later. The invention will first be explained in a qualitative manner relative to the embodiments shown in FIGURES 1 and 2 and then it will be explained mathematically relative to the embodiment shown in FIGURE 4.

The detection mask 22 shown in FIGURE 1 has the same pattern thereon as does object 20. That is, as shown in FIGURE 1, the pattern on object 20 correlates with the pattern on detection mask 22. FIGURE 2 shows the same system as is shown in FIGURE 1. However, in FIGURE 2 the pattern on object 20 is not identical to the pattern on detection mask 22'. Hence, with the object and detection mask shown in FIGURE 1, a bright spot appears on screen 18; however, with the object and detection mask shown in FIGURE 2 a bright spot does not appear on screen 18. FIGURE 1 will be used to explain the operation of the system when the pattern on object 20 is identical to the pattern on detection mask 22 and FIGURE 2 will be used to explain the operation of the system when the pattern on object 20 is not the same as the pattern on detection mask 22'.

Figure 3:
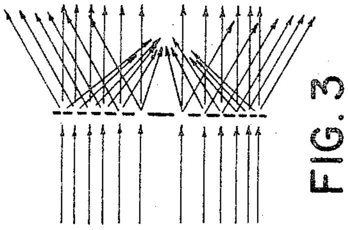
FIGURE 3 shows the effect of a Fresnel pattern on light passing therethrough.

FIGURE 3 shows an enlarged cross sectional view of one of the Fresnel zone plates on input object 20. As is well known, when parallel light is incident on a Fresnel zone plate, part of the light passes straight through the zone plate much as light passes straight through a plane of glass, part of the light is focused to a point in the same manner that a convex lens focuses light and part of the light is made divergent much as a concave lens diverges light. During the explanation of the embodiments of the invention shown in FIGURES 1 and 2, we are only going to consider that portion of the light which is focused to a point. The other portions of the light merely have the same effect as does noise in a system. It is noted that a Fresnel zone plate can also be called a Fresnel diffraction pattern; however to avoid confusion of terms, herein the words Fresnel zone plate are used to describe the patterns R, S and T. An elementary discussion of Fresnel zone plates and Fresnel diffraction is given in a book entitled Optics by Francis Weston Sears, published by Addison Wesley Publishing Co., 1949, and in a textbook entitled Fundamentals of Optics by Francis A. Jenkins and Harvey E. White, published by McGraw-Hill Book Company, 1957. No further discussion of the mechanics of Fresnel diffraction and Fresnel zone plates is given herein since these patterns and their effect is well known in the art.

The parameters of the zone plates R, S and T that are located on object 20 (i.e. the radius and frequency of these patterns) are chosen so that the distance to the focal point of the zone plate is the same as the distance from object 20 to ground glass 16. Thus, when the collimated light from light source 10 is incident upon zone plates R, S and T, three dots respectively designated R', S', and T' are formed on ground glass 16. The three dots on ground glass 16 essentially form three independent light sources for the second group of components. The light from each dot passes through lens 14 and mask 22 and it forms a diffraction pattern on screen 18. Mask 22 has three Fresnel zone plates thereon designated R'', S'' and T''. The zone plates R'', S'' and T'' on detection mask 22 are identical to the three Fresnel zone plates R, S and T on object 20. The distance from detection mask 22 to screen 18 is equal to the distance between the zone plates R'', S'' and T'' and their focal points. Thus for each point source of light in plane 16, the Fresnel diffraction pattern generated due to zone plates R'', S'' and T'' consists of three dots.

Figure 1B:
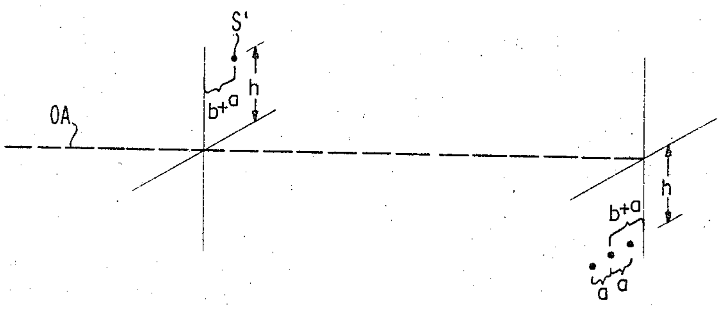
Figure 1C:
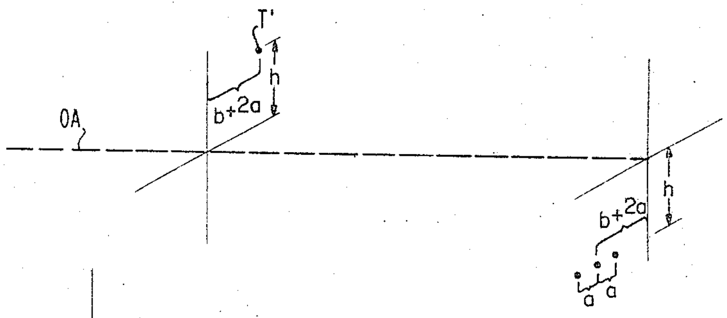

FIGURES 1A, 1B and 1C show the diffraction patterns generated on screen 18 by each of the dots R', S' and T' which appear on ground glass 16. Naturally, due to lens 14 there is an inversion in the quadrants wherein the light appears. As shown in FIGURE 1A, dot R' generates three dots on screen 18. The center of these dots is located $b$ units from the vertical axis since dot R' is located $b$ units from the vertical axis. The distance between the dots generated on screen 18 by the light from dot R' are located $a$ units apart because the three zone plates R'', S'' and T'' on mask 22 are $a$ units apart. As shown in FIGURE 1B, dot S' is located $b+a$ units from the vertical axis and it generates three dots on screen 18. The center of the three dots on screen 18 generated by dot S' is located $b+a$ units from the vertical axis. Since the zone plates R'', S'' and T'' on mask 22 are located $a$ units apart, the dots on screen 18 are located $a$ units apart. FIGURE 1C shows the pattern generated by the light from dot T'. Dot T' is located $b+2a$ units from the vertical axis; hence, the center of the pattern generated by dot T' is located $b+2a$ units from the vertical axis. Again, since the zone plates R'', S'' and T'' in mask 22 are located $a$ units apart, the three dots shown in FIGURE 1C are located $a$ units apart.

Figure 1D:
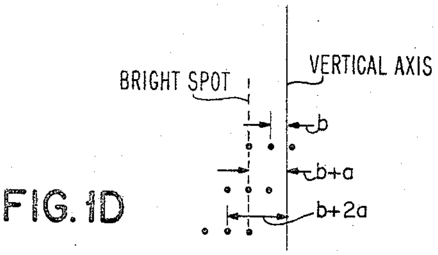

FIGURE 1D shows the alignment of the dots in the three patterns shown in FIGURES 1A, 1B and 1C relative to the vertical axis. Clearly, at a point located $b+a$ units from the vertical axis three dots coincide. In FIGURE 1D the pattern generated by the three dots R', S' and T' are shown separated. Naturally, it will be understood that this is merely for illustration. As shown in FIGURES 1A, 1B and 1C, the distance from each of these patterns to the horiozntal axis is $h$ units; hence, the three patterns are superimposed on screen 18 and a bright spot appears $b+a$ units from the vertical axis and $h$ units below the horizontal axis. The location of the bright spot which appears on screen 18 indicates the location of the pattern on object 20. On screen 18, the center of the bright spot which appears is located $h$ units below the horizontal axis and $b+a$ units from the vertical axis. The center of the pattern on object 20 is also located $h$ units from the horizontal axis and $b+a$ units from the vertical axis. Due to the action of lens 14, the entire pattern is inverted such that spots in the third quadrant on screen 18 indicate characters in the first quadrant of object 20. Thus, the bright spot on screen 18 indicates that object 20 has a pattern thereon that is identical to the pattern on detection mask 22. Furthermore, the location of the bright spot on screen 18 indicates the location of the correlating pattern on object 20.

The system is shift invariant in that the relative alignment between input object 20 and detection mask 22 is not particularly important. However, the location of the bright spot in the output plane (i.e. on mask 18) that indicates correlation is dependent upon the location of the character or pattern on input object 20. The system can be made completely shift invariant by replacing screen 18 with a threshold device that responds to a bright spot anywhere in the output plane.

In the system shown in FIGURE 2, the pattern on object 20 is not identical to the pattern on detection mask 22. The difference is that object 20 has three circular Fresnel zone plates located $a$ units apart and detection mask 22′ has three circular Fresnel zone plates located $c$ units apart. (The distance $c$ is not equal to the distance $a$).

As in the system shown in FIGURE 1, the three circular Fresnel zone plates R, S and T on object 20 in FIGURE 2 generate three dots R′, S′ and T′ on ground glass 16. Likewise, each of the dots R′, S′ and T′ on ground glass 16 acts as a light source for the second ground of components and each of the dots R′, S′ and T′ generate a set of three dots due to the three circular Fresnel zone plates R″, S″ and T″ that are on detection mask 22′.

Figure 2A:
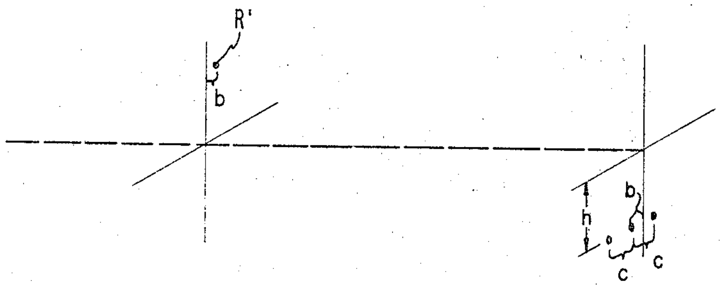
FIGURES 2A, 2B, 2C and 2D are schematic diagrams used which explain the operation of the systems shown in FIGURE 2.
Figure 2B:
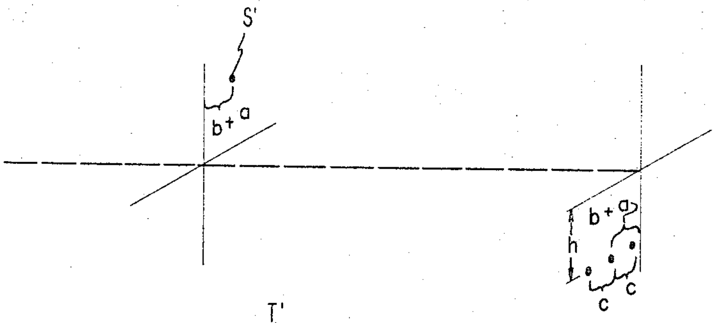
Figure 2C:
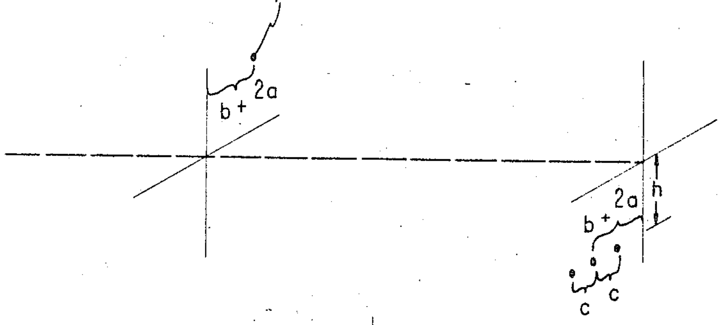

FIGURE 2A shows the Fresnel pattern generated by the light from dot R′. Three dots are formed. The center of the three dots is located $b$ units from the vertical axis since the dot R′ is located $b$ units from the vertical axis. However, the three dots are separate by $c$ units since the patterns on mask 22′ are separated by $c$ units. FIGURES 2B and 2C show the pattern generated by the light from dots S′ and T′. In FIGURE 2B the center of the pattern is $b+a$ units from the vertical axis and in FIGURE 2C the pattern is $b+2a$ units from the vertical axis. In each of the patterns the dots which form the pattern are located $c$ units apart.

Figure 2D:
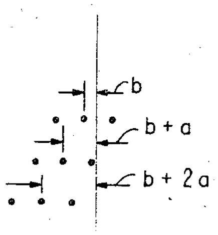

FIGURE 2D shows the alignment of the three patterns shown in FIGURES 2A, 2B and 2C. Since the centers of the three patterns are respectively $b$, $b+a$ and $b+2a$ units from the vertical axis and the dots which comprise each pattern are $c$ units apart, there is no point at which a plurality of dots are aligned as in FIGURE 1D. Thus, no bright spot appears on screen 18 thereby indicating that the pattern on object 20 is different than the pattern on detection mask 22′.

The operation of the present invention can in general be explained in the following manner. In the first group of components the light from source 10 is shifted or bent in passing through object 20 due to Fresnel diffraction. The amount of shifting or bending determines the shape and location of the pattern on ground glass 16. The second group of components use the light from the first group of components as a source and this light is again shifted due to Fresnel diffraction. If the characters on mask 22 are identical to the characters on object 20 and are properly rotated, the shifting is reversed; hence, the light is brought together to form a bright spot. If, however, the pattern on detection mask 22 is not identical to the pattern on object 20, the shifting due to the second group of components is not the reverse of the shifting due to the first group of components and, hence a bright spot does not appear on screen 18.

It is not evident from the embodiments of the invention shown in FIGURES 1 and 2 that the pattern on detection mask 22 is rotated by one hundred and eighty degrees relative to the pattern on object 20. The reason for this is that in the first embodiment, the patterns on object 20 and detection mask 22 are symmetrical and, hence, the rotation is not apparent. However, as will be explained in detail later, the pattern on detection mask 22 must be rotated one hundred and eighty degrees relative to the pattern on object 20. It is this rotation that causes the light to be shifted in the opposite direction thereby forming a bright spot if the pattern on object 20 correlates to the pattern on detection mask 22.

In the first group of components the pattern which forms the Fresnel diffraction pattern on ground glass 16 may be located anywhere relative to the optical axis OA. Thus, the diffraction pattern on ground glass 16 may be located anywhere relative to the optical axis OA. Thus, while the location of the light source for the first group of components is fixed, the location of the light source for the second group of components varies. However, in the second group of components the pattern on detection mask 22 is always centered relative to the optical axis OA. Thus, again, there is a reversal between the first and second group of components. In the first group of components the location of the light source is fixed relative to the optical axis OA and the location of the pattern relative to the optical axis OA varies while in the second group of components the location of the light source varies relative to the optical axis OA and the location of the pattern is always centered on the optical axis OA.

For simplicity as shown herein, lens 12 has the same focal length as lens 14 and the distance from light source 10 to lens 12 and the distance from ground glass 16 to lens 14 are both equal to the focal length of the lenses. The distance $w$ from lens 12 to object 20 is not critical; however, it should be relatively short. Likewise, the distance from object 20 to ground glass 16 is not critical but it should be relatively short. The distance from object 20 to ground glass 16 must be substantially equal to the distance from mask 22 to screen 18. This is necessary because the action of the components of group ONE must correspond substantially to the action of the components in group TWO. As shown, the distance $w$ from lens 12 to object 20 is equal to the distance $r$ from lens 14 to mask 22. Since the light from lens 12 is collimated the distance from lens 12 to object 20 is immaterial. Lens 14 and mask 22 need not be juxtaposed; however, if they are not juxtaposed, the location of the bright spots on the screen 18 will not exactly correspond to the location of the correlating characters on object 20. If the light which strikes object 20 is not collimated (as it is in the embodiments shown herein) the distance from lens 12 to object 20 must be equal to the distance from lens 14 to mask 22.

Light source 10 could be a laser or any other spectrally coherent point source. It is, however, important that the light incident on object 20 be almost spatially coherent and almost spectrally coherent.

FIGURE 4 shows a second preferred embodiment of the present invention. In this second embodiment of the invention, object 20 has a plurality of English words thereon. (NB each word is in essence a particular type of pattern). In the embodiment shown in FIGURE 4 screen 18 has been replaced with a flying spot scanner 32. The output of flying spot scanner 32 goes through a filter 33, through a clipping circuit 34 and to a counter 35.

The embodiment of the invention shown in FIGURE 4 will first be explained qualitatively and later it will be explained mathematically.

Each of the words on input object 20″ form a Fresnel diffraction pattern on glass 16. Due to the complexity of the lines that form each word, the Fresnel diffraction patterns that appear on ground glass 16 essentially comprise an area having various intensities of light.

The detection mask 22″ shown in FIGURE 4 has the word DOG located thereon. Thus, a bright spot appears on the face of flying spot scanner 32 corresponding in location (except for a 180 rotation) of the word DOG on input object 20. As shown, the input object 20 has the word DOG thereon at two different locations. The word DOG appears on object 20 once in the first quadrant and once in the fourth quadrant. Thus, on face 32A of flying spot scanner 32, bright spots appear in the second and third quadrants since the second quadrant on face 32A corresponds to the fourth quadrant on input object 20″ and since the third quadrant on the face of flying spot scanner 32 corresponds to the first quadrant on input object 20″.

Flying spot scanner 32 scans its face 32A and generates a signal on line 32C indicative of the intensity of the light on the face of 32A. Filter 33 allows high frequency signals to pass; however, it blocks low frequency signals. Thus, sharp pulses that appear on line 32C pass through filter 33. However, signals which have a relatively constant magnitude for a substantial period of time do not pass through filter 33. The output of filter 33 passes through a clipping circuit 34 which allows large pulse signals to pass and which cuts out any noise signals which have relatively low intensity. A counter 24 counts the number of pulses which appear at the output of clipping circuit 34. With the particular input object and detection masks shown in FIGURE 4 two bright spots appear on the face of flying spot scanner 32. Hence, when the flying spot scanner 32 scans its face, two pulses appear at the output of clipper 34 and the number "two" is stored in counter 35 thereby indicating that the word DOG which appears in detection mask 22″ also appears on input object 20″ in two different places.

The system shown in FIGURE 4 has an additional lens 21 that is located adjacent to ground glass 16. Lens 21 has the same focal length as do lenses 12 and 14. The purpose of lens 21 is to focus all of the light passing through ground glass 16 toward the optical axis OA. Thus, a greater portion of the light will be passed through the transparent portions of detection mask 22″ thereby giving greater contrast to the illumination which appears on the face of flying spot scanner 32A. Lens 21 does not change the principle of the operation of the device; however, it increases the signal to noise ratio.

In the system shown in FIGURE 4, the number stored in counter 35 merely indicates the number of times that the desired word occurs on object 20. If one is also interested in the location that the desired word occurs, additional timing and storage circuitry could be provided to record the relative time of occurrence of the pulses on the output of circuit 34.

The operation of the second embodiment of the invention shown in FIGURE 4 can be explained mathematically as follows: Each word on the input object 20 can be represented by the complex transmission function $f_n(x-x_n)$, centered around $x_n (n=1, 2 \ldots)$. The Fresnel diffraction patterns that are formed on ground glass 16 may be represented by the functions $$\Sigma \hat{f}_n(x-x_n)$$

where $\wedge$ means the Fresnel transformation. The locations $x_n$ are maintained but the phase relationships due to the action of the diffusing element 21 are destroyed. This means that beyond element 16 we must consider the intensity distribution $$\hat{f}(x)=\Sigma \hat{f}_n(x-x_n) \rightarrow |\hat{f}(x)|^2=F(x)$$

At a one focal length from the lens 21 the plane wave generated by one particular point $\bar{x}$ on diffusing element 16 can be represented by the expression $$\exp\left(2\pi i\frac{x\bar{x}}{\lambda f}\right)$$

plus a phase factor. The phase factor is of no consequence; hence, it will not be considered. At a finite distance beyond mask 22″, Fresnel diffraction patterns are formed, but they are shifted off-axis due to the oblique illumination. If $f_k(-x)$ is the complex magnitude describing the detection mask 22″, $$\hat{f}_k(\bar{x}-x)e^{i\varphi(x,\bar{x})}$$

is the complex amplitude in the plane of screen 32A. (Note that the pattern on mask 22 is rotated by 180 degrees.) The phase $\varphi(x,\bar{x})$ is of no interest, since we only observe intensities $$|\hat{f}_k(\bar{x}-x)|^2=F_k(\bar{x}-x)$$

Light is emerging toward the output plane from all points $\bar{x}$ on the ground glass. Integrating over all points $\bar{x}$ in the plane of ground glass 16 (adding resulting intensities) one gets an intensity distribution in the output plane:

$$I(x)=\int F(\bar{x})F_k(\bar{x}-x)d\bar{x}$$

In order to see how the autocorrelation peak comes about, we can decompose F($x$) as follows:

$$F(\bar{x})=|\hat{f}(\bar{x})|^2=\Sigma|\hat{f}_n(\bar{x}-x_n)|^2=$$

$$\Sigma|\hat{f}_n(\bar{x}-x_n)|^2+\sum_{n\neq m}\Sigma \hat{f}_n(\bar{x}-x_n)\hat{f}^*_m(\bar{x}-x_m)=\Sigma Fn(\bar{x}-x_n)+$$

$$\sum_{n\neq m}\Sigma \ldots;\ \Sigma F_n(\bar{x}-x_n)=F_k(\bar{x}-x_k)+\sum_{n\neq k}F_n(\bar{x}-x_n)$$

substituting in the expression for intensity gives $$I(x)=\int F_k(\bar{x}-x_k)F_k(\bar{x}-x)d\bar{x} \leftarrow \text{Signal Term}+$$

$$\int_{n\neq k}F_n(\bar{x}-x_n)F_k(\bar{x}-x)dx \leftarrow \text{Intensity Noise}+$$

$$\sum_{n\neq m}\Sigma\int \hat{f}_n(\bar{x}-x_n)\hat{f}^*_m(\bar{x}-x_m)F_k(\bar{x}-x)d\bar{x} \leftarrow \text{Amplitude Noise}$$

The signal term $\int F_k(\bar{x}-x_k)F_k(\bar{x}-x)d\bar{x}$ has a maximum at $x=x_k$. This point corresponds to the "image point" of the word to be detected in the input page.

The noise terms are less harmful if there is less geometrical overlap between $$\hat{f}_n(\bar{x}-x_n) \text{ and } \hat{f}_m(\bar{x}-x_m)$$

or between $F_n(\bar{x}-x_n)$ and $F_k(\bar{x}-x)$. Part of the amplitude noise can be helpful in order to build up a strong detection peak if either $n=k$ or $m=k$. The intensity noise can be discussed on the basis of a Parseval generalization for Fresnel transforms. The noise can be further reduced by (a) specially designed edges on the characters in mask 22, (b) if the input page has black letters on white ground, (c) by contrast reversal using a central dark field and (d) by illuminating different segments of the input object with separate spatially and spectrally coherent sources.

In the simplest embodiment of the invention, all three of the lenses 12, 21 and 14 could be eliminated and the invention would operate in accordance with the previously described principles. However, if lenses 12 and 14 were eliminated, the signal to noise ratio would be extremely low. As shown herein, the various lenses all have the same focal length. Naturally, it should be understood that this has merely been done for the convenience of illustration and in order to satisfy other requirements, lenses of different focal length could be used. Furthermore, as shown herein, all of the components in the system are positioned along a straight line and both input object 20 and detection mask 22 have characters thereon which consist of transparent areas in otherwise opaque masks. The optical axis of the system need not be a straight line and either or both the input object and the detection mask could consist of specular reflective characters rather than the transmissive type characters as shown herein. Furthermore, the characters on object 20 and detection mask 22 could be opaque areas on a transparent background. In this case dark spots would have to be detected on the output.

As in other types of optical correlation systems, under certain circumstances normalization of the output signals is required. That is, the peak intensity that identifies a correlation is to some extent dependent upon the particular character in detection mask 22. This difficulty can be compensated for by determining the peak intensity which indicates the correlation as a function of a particular detection mask in the system. With the system shown in FIGURE 4 no explicit normalization is needed since the output only responds to changes in intensity. In the system shown in FIGURE 4, filter 33 essentially operates as a normalization circuit.

The screen 18 shown in the first and second embodiments and the face 32A of flying spot scanner 32 essentially form output planes for the optical correlation system of the present invention. As used herein, the word "character" encompasses both alphanumeric characters and various types of patterns such as the Fresnel pattern shown herein and other patterns such as may exist from aerial photographs.

The ground glass 16 shown in the various embodiments of the invention hereinbefore described is merely one specific example of a light diffusing type of element. Various other known elements that diffuse light could be used in place of the ground glass shown herein.

While the invention has been particularly shown and describer with reference to preferred embodiments thereof, it will be understood by those skilled in the art that the foregoing and other changes in the form and details may be made therein without departing from the spirit and scope of the invention.

What is claimed is:

1. An optical correlation system, comprising:
an object having characters thereon;
a plane of ground glass;
means for forming a Fresnel diffraction pattern of said characters on said ground glass;
a mask having a particular character thereon;
an output plane;
means for creating Fresnel diffraction patterns of said particular character in said output plane using the light from said ground glass as a light source;
whereby peak light intensities are created in said output plane at locations corresponding to the locations on said input object where a character corresponding to said particular character is located.

2. An optical detection system, comprising:
an object having characters thereon;
scattering means for diffusing light which is incident thereon;
a spatially and spectrally coherent source for generating coherent light;
means for forming a Fresnel diffraction pattern of said characters on said scattering means with said coherent light;
a second mask having a selected character thereon, and
means for using the light from said scattering means to generate Fresnel diffraction patterns of the selected character on said second mask, each point of said scattering means that is illuminated generating a separate diffraction pattern of said selected character,
whereby said diffraction patterns correlate to form a bright spot when the character on said object and said selected characters correlate.

3. An optical system for detecting the presence of a particular pattern on an object;
light diffusing means positioned near said object;
means for generating coherent light;
means for illuminating said object with said coherent light to form Fresnel diffraction patterns on said light diffusing means;
a mask having said particular pattern thereon, and means for directing the light from said diffusing means through said mask,
whereby light from each point on said light diffusing means forms a Fresnel diffraction pattern of said particular pattern and a bright spot is generated when a pattern on said object correlates to the pattern on said mask.

4. An optical system for detecting the presence of a particular pattern on an object, said optical system having an optical axis and said object being positioned on said optical axis;
light diffusing means positioned on said optical axis near said object;
means positioned on said optical axis for illuminating said object with coherent light,
whereby Fresnel diffraction patterns are generated on said light diffusing means by any patterns on said object;
a mask having said particular pattern thereon, said mask positioned on said optical axis,
whereby light from each point on said light diffusing means forms a Fresnel diffraction pattern of said particular pattern thereby generating a bright spot when a pattern on said object correlates with said particular pattern.

5. An optical system having an optical axis;
an object having characters thereon positioned on said optical axis;
means positioned on said optical axis for illuminating said object with spatially and spectrally coherent light;
light diffusing means juxtaposed to said object;
whereby Fresnel diffraction patterns are formed on said light diffusing means by said characters on said object;
a convex lens positioned on said optical axis beyond said light diffusing means;
a mask having said particular character thereon juxtaposed to said lens,
whereby each illuminated point on said light diffusing means acts as a light source and generates Fresnel diffraction patterns of said particular character on said mask and thereby generates a bright spot when the character on said mask correlates with a character on said object.

6. The combination recited in claim 4 wherein said pattern on said mask is centered on said optical axis,
whereby the locations where said bright spot appear indicate the locations on said object where the correlating character appears.

7. The combination recited in claim 5 wherein said character on said second mask is centered on said optical axis,
whereby the locations where said bright spot appear indicate the locations on said object where the correlating character appears.

8. The combination recited in claim 2 wherein said scattering means comprises a plane of ground glass.

9. The combination recited in claim 3 wherein said diffusing means comprises a plane of ground glass.

10. The system recited in claim 1 including a flying spot scanner to scan said output plane to detect points of peak illumination and to generate electrical signals in response thereto.

11. The combination recited in claim 10, including:
a high pass filter for filtering the signals generated by said flying spot scanner, and
a counter for counting the member of pulses generated by said filter.

12. The system recited in claim 3 including a flying spot scanner positioned to scan the Fresnel patterns generated by said particular character to detect points of peak illumination and to generate electrical signals in response thereto.

13. The combination recited in claim 12 and a high pass filter for filtering the signal generated by said flying spot scanner, and a counter for counting the number of pulses generated by said filter.

14. An optical system for detecting the presence of a particular character on an object comprising:

means for generating Fresnel diffraction patterns due to the characters on said input object;

light diffusing means positioned to receive said Fresnel diffraction patterns;

a mask having a particular character thereon;

means for using the light from said light diffusing means to generate Fresnel diffraction patterns of said particular character, whereby points of peak intensity are generated when a character on said input object correlates with said particular character.

References Cited

UNITED STATES PATENTS 3,196,392 7/1965 Horwitz ---------- 340—146.3

OTHER REFERENCES

Sears, Optics, 3rd ed., 1956, pp. 223–226.

MAYNARD R. WILBUR, *Primary Examiner.*

JAMES A. SHERIDAN, *Asistant Examiner.*

U.S. Cl. X.R.

88—1